(12) United States Patent
Thompson

(10) Patent No.: US 6,739,227 B2
(45) Date of Patent: May 25, 2004

(54) APPARATUS AND METHOD FOR PROVIDING AN ENHANCED METAL CUTTING SAW BLADE

(76) Inventor: Robert Lindsay Thompson, PO Box 74 Beaufort 3373, Victoria (AU)

( * ) Notice: Subject to any disclaimer, the term of this patent is extended or adjusted under 35 U.S.C. 154(b) by 0 days.

(21) Appl. No.: 09/891,590

(22) Filed: Jun. 26, 2001

(65) Prior Publication Data

US 2003/0061920 A1 Apr. 3, 2003

Related U.S. Application Data

(60) Provisional application No. 60/214,558, filed on Jun. 27, 2000.

(51) Int. Cl.7 .............................. B26D 1/00; B23D 45/00
(52) U.S. Cl. ............................................. 83/13; 83/835
(58) Field of Search .................. 83/835, 855, 836–854, 83/13

(56) References Cited

U.S. PATENT DOCUMENTS

| | | | |
|---|---|---|---|
| 1,083,645 A | | 1/1914 | Wettstein |
| 2,360,336 A | | 10/1944 | Gibbs |
| 2,667,904 A | | 2/1954 | Gommel |
| 2,714,317 A | * | 8/1955 | Drake ........................ 76/112 |
| 3,619,880 A | * | 11/1971 | Pahlitzsch ................... 407/61 |
| 3,700,016 A | | 10/1972 | Strobel |
| 3,730,038 A | | 5/1973 | Farb |
| 4,011,783 A | * | 3/1977 | Mobley ........................ 83/846 |
| 4,060,880 A | * | 12/1977 | Nowak .......................... 407/61 |
| 4,106,382 A | * | 8/1978 | Salje et al. .................... 83/835 |
| 4,463,645 A | * | 8/1984 | Goellner ....................... 83/852 |
| 4,776,251 A | * | 10/1988 | Carter, Jr. ..................... 83/835 |
| 5,182,976 A | | 2/1993 | Wittkopp |
| 5,261,306 A | * | 11/1993 | Morey et al. .................. 83/840 |
| 5,351,595 A | | 10/1994 | Johnston |
| 5,524,518 A | * | 6/1996 | Sundstrom .................... 83/845 |
| 5,542,177 A | | 8/1996 | Hillestad |
| 5,555,788 A | * | 9/1996 | Gakhar et al. ................. 83/835 |
| 6,065,370 A | | 5/2000 | Curtsinger |

FOREIGN PATENT DOCUMENTS

| | | | | |
|---|---|---|---|---|
| DE | 3943321 A1 | * | 7/1990 | ........... B23D/61/04 |
| JP | 53113388 | | 10/1978 | |
| JP | 6000716 | | 1/1994 | |
| WO | WO85/1242 | | 3/1985 | |

* cited by examiner

Primary Examiner—Allan N. Shoap
Assistant Examiner—Isaac Hamilton
(74) Attorney, Agent, or Firm—Roberts Abokhair & Mardula, LLC

(57) ABSTRACT

A saw blade is disclosed for the high-speed cutting of ferrous alloys. A blade with negatively-raked carbide-tipped teeth, a large gullet between each tooth, and vibration-reducing arc-shaped slots allow for the essentially burr-free cold-cutting of steel without lubricant.

12 Claims, 2 Drawing Sheets

FIGURE 1
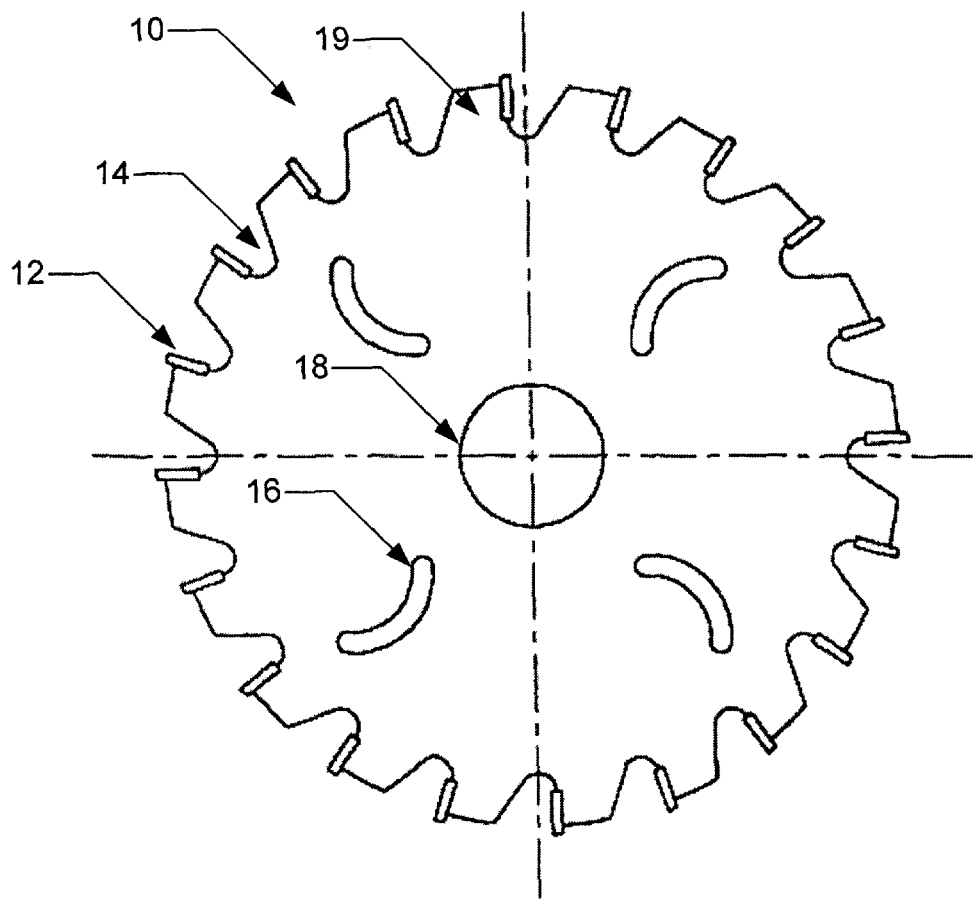
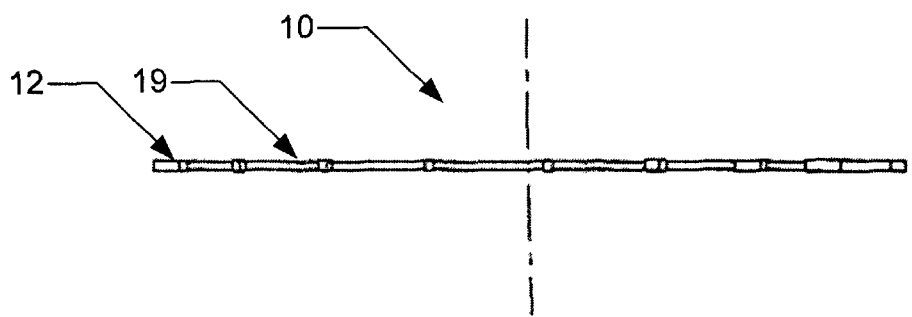
FIGURE 2

APPARATUS AND METHOD FOR PROVIDING AN ENHANCED METAL CUTTING SAW BLADE

RELATED APPLICATIONS

This application claims the benefit of U.S. Provisional Application Serial No. 60/214,558, filed Jun. 27, 2000 and incorporated herein in its entirety.

FIELD OF THE INVENTION

The present invention is to an enhanced metal cutting saw blade, a method of making the saw blade and a method of using the saw blade. More particularly, the enhancement of the present invention provides a circular, steel saw blade that incorporates unique saw blade gullets and blade slots in combination with negative rake tungsten carbide tips. These enhancements allow a 4" circular blade, rotating at speeds in excess of 10,000 rpm, to cold-cut steel of 1/32" up to 5/8" thick and provides a cold-cutting action without any lubricant, leaving the material touch-cool, with no distortion or burrs.

BACKGROUND OF THE INVENTION

Two basic types of prior art blades are used on cut-off saws: abrasive blades and diamond blades. Abrasive blades consist of hard, abrasive grains held together by a bonding material, usually a synthetic resin. Blades containing silicon carbide abrasive grains are used to cut concrete, masonry, stone and similar materials; aluminum oxide abrasives are incorporated into blades used to cut metal.

Diamond blades have diamond-impregnated segments welded around the perimeter of the blade core. Choosing a diamond blade is difficult because there's no reliable way to measure quality without actually using one. The diamond content of the segments is important, but it doesn't tell the whole story. The rate at which the metal matrix wears away to expose new diamonds also affects performance and blade life. The height of the diamond segments also is misleading because some blades have bigger non-diamond-bearing bases than others.

There is also a big difference in the cost and performance of abrasive and diamond blades. A 12-inch-diameter abrasive blade costs from $7 to $17, and a 14-inch-diameter blade costs $10 to $23. On the other hand, 12-inch-diameter diamond blades cost from $200 to $550, and 14-inch-diameter blades cost from $300 to $650. Manufacturers stress that paying the higher up-front cost for a diamond blade will ultimately result in a lower cost per cut. When extensive cut-off sawing is planned, investing in diamond blades is generally thought to be worth the expense. But many contractors opt for abrasive blades simply because if they are lost or stolen, the replacement costs are much lower.

Abrasive blades can only be operated when dry. Water cannot be used to cool the blade or to suppress dust. Dry-cutting diamond blades can be used either dry or wet, but a wet-cutting diamond blade can never be used without water. Using wet blades without water, even for a few seconds, generates excessive heat, resulting in blade damage and creating a safety hazard. As these blades are not made of metal, they are generally not resharpenable.

High speed steel blades have been used for cutting non-ferrous metals, and certain steel blades without carbide tips have been used to cut steel. However, these blades are very noisy, throw hot metal in the form of sparks, and leave large burrs.

A characteristic of all of these blades is that they are noisy, generate heat, and produce burrs when cutting metal, which must then be removed by additional finishing techniques. A resharpenable, quieter, cold-cutting blade which produces no burrs would therefore solve many problems in the prior art.

BRIEF SUMMARY OF THE INVENTION

The invention consists of a rotating steel saw blade for rotating at speeds in excess of 10,000 r.p.m. to cut steel of 1/32" to 5/8" thick without producing burrs. The blade has a 4" diameter with a central mounting hole and ~20 teeth, such that the periphery of the 4" blade travels at a speed in excess of 174.5 ft./sec. The blade has four arc-shaped, radial cooling slots that also reduce noise and vibration. The teeth have tungsten tips with negative/clearance rakes as shown on the attached drawing. A particularly unique feature is the gullets between the teeth, which have an angled leading portion (i.e., 35–40 degrees from radial) leading to a radius-portion of the gullet. This gullet design allows the blade to effectively clear the cut portions of metal. This combination of features allows a cold-cutting action without any lubricant, leaving the material touch cool with no distortion or burrs.

It is an object of the invention to provide a blade for cut-off saws that removes only 1/16" of material.

It is a further object of the invention to provide a blade for cut-off saws that can cut steels from 1/32" to 5/8" thick.

It is a further object of the invention to provide a blade for cut-off saws that allows a cold-cutting action without any lubricant, leaving the material touch cool with no distortion or burrs.

It is a further object of the invention to provide a blade for cut-off saws that clears waste material by using forwardly-raked gullets between cutting teeth.

It is a further object of the invention to provide a blade for cut-off saws that is cooler, quieter, and has reduced vibration due to the inclusion of arced slots on the blade body.

It is another object of the invention to provide a blade for cut-off saws that is resharpenable and has high wear-resistance characteristics.

It is another object of the invention to provide a blade for cut-off saws that employs carbide inserted cutting teeth electronically welded with a shock absorbing medium to a high nickel high chrome heat stabilized base material, heat treated to 44 RHC.

It is yet another object of the invention to provide a blade for cut-off saws that rotates at speeds in excess of 10,000 r.p.m. to cut steel with negatively-raked tungsten carbide teeth.

It is yet another object of the invention to provide a retractable guard for the saw-blade of the present invention when in use.

BRIEF DESCRIPTION OF THE DRAWINGS

FIG. 1 illustrates a saw blade in accordance with the present invention.

FIG. 2 illustrates an edge-view of the saw blade of FIG. 1.

DETAILED DESCRIPTION OF THE INVENTION

In its preferred embodiment, as illustrated in FIGS. 1–2, the present invention is drawn to a metal-cutting 4" diameter carbide-inserted saw blade 10. The blade has a kerf (width of saw cut, or material removed whilst cutting) of 1/16". For maximum metal cutting efficiency the blade has 20 carbide teeth 12. The blade is designed for a maximum material thickness cut of 5/8". It is designed to cut all types of mild steel, as well as many of the higher grade tool steels. The blade includes a central mounting hole 18 and is preferably used in conjunction with hand held high-speed portable power or fixed industrial machines using single phase or three phase power.

The blade is designed to rotate at extremely high speeds, in excess of 10,000 revolutions per minute, operating with rapid metal removal. The blade requires absolutely no lubricant. This is due to the negative rake of the cutting teeth 12, which produces its unique cold-cutting action that leaves the material touch-cool immediately. As a result of this cold-cutting action, the material has absolutely no distortion, and has no burrs on the under side of the material, thus saving operator time for a deburring process.

The blade can be adapted to many portable hand held power tools, all of which can be required to conform to the standards of the relevant countries that it would be sold. For example, the present embodiment has been adapted for use with an extremely high volume power tool, the four-inch hand held angle grinder. As a result of the combination of the blade and the angle grinder it has been necessary to develop a guard to safely allow this to happen.

As it may not be possible to market such a dangerous power tool accessory, it was essential to design a fully retractable four-inch guard. The main purpose of this was to allow the operator to have maximum eye contact with the materials that are being cut, as well as maximum operator safety.

The guard's main function is to totally encase the saw blade in a spring-loaded manner whilst the machine is not cutting, whether the blade is rotating or stationary. When the operator wishes to commence the cut, he begins by applying substantial pressure to one of the handles. This allows the blade to start its protrusion from within the fully protected area, and to cut the given material with total safety to the operator. The guard is manufactured from a combination of steel and injection molded polycarbonate. For safety reasons, it is critical that the four-inch blade not be used without the protection of the retractable guard.

Figure 3A:
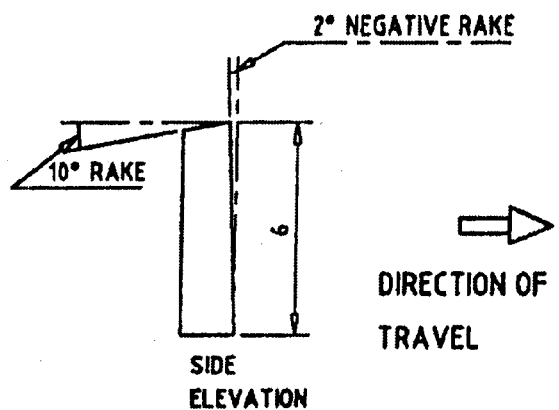
FIG. 3A illustrates a side elevation-view of the saw blade tooth of the present invention.
Figure 3B:
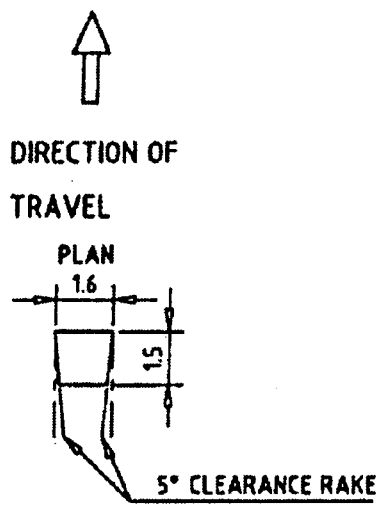
FIG. 3B illustrates a plan or top-view of the saw blade tooth of FIG. 3A.

The blade is designed for cold-cutting (i.e., cutting without lubricant). By changing the angles marginally, it was found to enhance the cutting speed of the blade through the material. As illustrated in FIG. 3A, the preferred angles consist of a 2 degree negative rake from the bottom to the top of the front face of the tooth, a 10 degree negative rake from the front to the back of the top face of the tooth, and, as illustrated in FIG. 3B, a 5 degree negative rake from the front to the back of the side faces of the tooth, wherein the front of the tooth is the leading face in the direction of travel.

The gullet 14 size has been substantially altered in the present invention. The problem with prior designs was that a small gullet (the cavity in which the tooth is inserted and the stowage space required for waste material whilst that tooth is still within the confines of the metal during its cut) had the tendency to allow for metal build up, leading to the following disadvantages:

1). The feed speed was reduced, having the follow-on effect of higher heat build up due to the longer time the blade was in the metal. By substantially altering the lead section of the gullet, the hot material is allowed to exit the gullet more freely, thus allowing less heat build up in the outer perimeter of the blade, which in turn produces faster feed speeds.

2). When the material was trapped within the confines of a small gullet, a significant resonance and vibration was caused, having the two fold effect of a higher heat level, as described above, and a higher noise level, leading to operator discomfort.

To reduce existing noise levels further, several slotted configurations were tested. The present inventor came to the conclusion and decided upon four semi-circular, arc-shaped slots 16. The best results found during testing was the placement of four radially-spaced arc-shaped slots positioned centrally from each tooth support. These slots also marginally decreased the working temperature of the blade, thus adding to the total wear factor of the blade 10.

The blade has twenty carbide inserted cutting teeth electronically welded with a shock absorbing medium to a high nickel high chrome heat stabilized base material 19 heat treated to 44 RHC.

The combination of a tungsten carbide tip, the novel gullet shape, the selected blade material, the addition of the semicircular heat and noise vents, and the tooth geometry makes this product unique from all existing metal circular saw technology. To further add to the enhancements, it is possible to have the blade 10 specially treated with a hard coating of titanium and aluminum-nitride. This process can be applied in a vacuum by the physical-vapor-deposition (PVD) process. The only problem with adding this process, whilst adding more enhancements to the blade 10, it that it adds cost to the final product, whereas testing has suggested that it may not be necessary. The substantial difference between this four-inch blade and the prior art technology for the use of cutting steel in milling machines is that prior art cutters are generally dependent on slow feed, slow blade revolutions, and large volumes of coolant.

Although disclosed for use with hand held high-speed portable power tools, the invention can also be used on fixed industrial machines using single phase or three phase power. The very high speed (in excess of 10,000 RPM) operation with rapid metal removal allows the blade to operate with absolutely no lubricant required due to the negative-rake cold-cutting action, leaving the material touch-cool with no distortion or burrs. It cuts just as effectively with thin sheet metal 1/32".

Additionally, although disclosed in its preferred form in a circular saw blade, it is also possible to adapt the tooth and kerf design of the present invention to other blade arrangements such as, but not limited to, band saw blades.

The preferred degree of forward rake of the leading portion of the gullet is about 35–40 degrees from a radially extending line (i.e., 50–55 degrees above a tangent to the blade's circumference).

The preferred shock absorbing medium for welding the teeth is Handy Flow Brazing Paste, type HF 111 Easy Flow, 35-67A1 Silver Concentrate.

What is claimed is:

1. A method of cold-cutting ferrous alloy without lubricant, comprising:
providing a circular saw blade with a plurality of substantially identical tungsten carbide inserted teeth adjacent each other about a periphery of said saw blade,
wherein each carbide inserted tooth consists essentially of a negatively raked face, a negatively raked top, and two negatively raked sides, and
wherein a gullet between each carbide inserted tooth is provided with a forward portion that is raked about 35–40 degrees from a radially extending line from a center of said circular saw blade; and rotating the periphery of said circular saw blade over said ferrous alloy at a speed in excess of 174.5 feet/second; and cold-cutting said ferrous alloy without using lubricant.

2. The method of claim 1 further comprising providing a plurality of arc-shaped slots in said circular saw blade to reduce noise and vibration.

3. The method of claim 1 wherein said face is negatively raked about 2 degrees, said sides are negatively raked about 5 degrees, and said top is negatively raked about 10 degrees.

4. The method of claim 1, wherein providing said blade further comprises electronically welding said carbide inserted teeth to a body of said saw blade with a shock absorbing material.

5. The method of claim 4, further comprising said body of said saw blade being formed of a high nickel, high chrome, heat stabilized base material that has been heat treated to a Rockwell Hardness of approximately 44.

6. The method of claim 5, further comprising applying a hard coating of titanium and aluminum-nitride to said blade.

7. A saw blade for cold-cutting ferrous alloy without lubricant, comprising:

a circular saw blade having a plurality of substantially identical tungsten carbide inserted teeth adjacent each other about a periphery of said saw blade, wherein each carbide inserted tooth consists essentially of a negatively raked face, a negatively raked top, and two negatively raked sides, and wherein a gullet between each carbide inserted tooth has a forward portion that is raked about 35–40 degrees from a radially extending line from a center of said circular saw blade.

8. The saw blade of claim 7, further comprising a plurality of arc-shaped slots in said circular saw blade positioned to reduce noise and vibration.

9. The saw blade of claim 7, wherein said face has a negative rake of about 2 degrees, said sides have a negative rake of about 5 degrees, and said top has a negative rake of about 10 degrees.

10. The saw blade of claim 7, further comprising a shock absorbing material between said tungsten carbide inserted teeth and a body of said saw blade for attaching said tungsten carbide inserted teeth to said body of said saw blade.

11. The saw blade of claim 10, wherein said body of said saw blade is a high nickel, high chrome, heat stabilized base material that has been heat treated to a Rockwell Hardness of about 44.

12. The saw blade of claim 11, further comprising a hard coating of titanium and aluminum-nitride on said blade.

* * * * *